United States Patent [19]

Calvin et al.

[11] 4,317,384

[45] Mar. 2, 1982

[54] MANUAL OVERRIDE DRIVE APPARATUS

[75] Inventors: Douglas G. Calvin, Missouri City; Richard C. Babb, Houston, both of Tex.

[73] Assignee: Tapco International, Inc., Houston, Tex.

[21] Appl. No.: 116,352

[22] Filed: Jan. 28, 1980

[51] Int. Cl.³ .............................................. F16H 1/18
[52] U.S. Cl. ....................... 74/424.8 A; 74/424.8 VA; 74/625
[58] Field of Search ................ 74/424.8 A, 424.8 VA, 74/625; 251/14, 130

[56] References Cited

U.S. PATENT DOCUMENTS

| 647,765 | 4/1900 | Schulz | 74/424.8 A |
|---|---|---|---|
| 950,431 | 2/1910 | Bradford | 74/424.8 A |
| 1,048,599 | 12/1912 | Smith | 74/424.8 A |
| 2,438,236 | 3/1948 | Strom | 74/424.8 A |
| 2,506,988 | 5/1950 | Beltz | 74/424.8 A |
| 2,724,978 | 11/1955 | Morrell | 74/424.8 VA |
| 2,885,172 | 5/1959 | Natho | 251/14 |
| 4,080,844 | 3/1978 | Killian | 74/424.8 A |
| 4,189,950 | 2/1980 | Killian | 74/424.8 A |

FOREIGN PATENT DOCUMENTS

| 2061408 | 6/1972 | Fed. Rep. of Germany ..... 74/424.8 A |
|---|---|---|
| 564279 | 12/1923 | France .......................... 74/424.8 A |

*Primary Examiner*—Lawrence J. Staab
*Attorney, Agent, or Firm*—Fulbright & Jaworski

[57] ABSTRACT

A manual override drive apparatus for use with normally powered driving assemblies, such as valve actuators, is disclosed which has a body having an axial bore therethrough, a shaft movable axially but not rotatably extending through the bore and having screw threads thereon, a cage in the body rotatably disposed about the shaft having elongate circumferentially arranged pockets and restrained against axial movement by thrust bearings, a plurality of elongated gear segments movably disposed in the pockets having screw threads which mate with the threads on the shaft, cam means operable to move the gear segments toward and away from the shaft for engagement and disengagement of the screw threads on the shaft and the gear segments, and means operable to rotate the cage and thus the gear segments thereby driving the shaft axially when the gear segments are in threaded engagement with the shaft.

13 Claims, 4 Drawing Figures

MANUAL OVERRIDE DRIVE APPARATUS

BACKGROUND OF THE INVENTION

The present invention is directed to auxiliary drive apparatus which can be operated manually for use with other driving assemblies, such as valve actuators, requiring very high thrust loads, for example up to 40,000 pounds.

There have been a number of auxiliary or override drive apparatus proposed for use with normally powered driving assemblies.

For example, U.S. Pat. No. 4,080,844 illustrates a manual control apparatus; however, this apparatus cannot obtain the thrust needed for heavy duty applications without drastic design changes. In addition, the length of the stem and hence movement of the shaft in this patent is limited because the shaft cannot run through the body at its top.

U.S. Pat. No. 4,114,469 discloses an auxiliary valve actuator in which the gears are in engagement at all times and are not disengageable.

U.S. Pat. No. 3,842,690 illustrates an automatically disengageable manual control, in which the drive nut is not free to float and the shaft is rotated rather than driven axially.

U.S. Pat. No. 3,667,730, discloses a quick-action jack which does have a declutchable nut; however, the shaft must be turned to move it and thrust can be exerted in one direction only rather than in both directions.

The apparatus of the above patents in general are not suitable for auxiliary driving, such as manual driving, of a shaft axially in both directions under high thrust loads of up to and in excess of 40,000 pounds, in which movement of the stem or shaft is not limited, and in which the shaft can be engaged and driven in any position.

SUMMARY OF THE INVENTION

The present invention is directed to an engageable and disengageable manual drive apparatus which can be used to drive a shaft axially under high thrust loads in either direction efficiently, readily and easily.

It is therefore an object of the present invention to provide an auxiliary engageable and disengageable drive apparatus which can be operated manually for use with another driving assembly by which the driven shaft can be driven axially in either direction under high thrust loads, for example, up to and in excess of 40,000 pounds.

Another object of the present invention is to provide such an auxiliary engageable and disengageable drive assembly which can be manually actuated easily and readily at any shaft position for driving the shaft in axial directions under high thrust loads, such as up to and in excess of 40,000 pounds.

A further object of the present invention is the provision of such an auxiliary engageable and disengageable drive apparatus which consumes a minimum amount of space, is readily and easily operated by hand under high thurst loads, and which is relatively inexpensive.

Other objects, features and advantages of the present invention will become apparent from the description given herein, the drawings and the appended claims.

In short, the auxiliary engageable and disengageable drive assembly comprises a body having an axially bore therethrough, a shaft movable axially but not rotatably in the bore and having screw threads thereon, a cage rotatably disposed in the body about and co-axially with the shaft, having a plurality of circumferentially disposed elongate pockets and restrained from axial movement by thrust bearings, a plurality of gear segments movably disposed in the cage and about the shaft, the gear segments being movable toward and away from the shaft and restrained from axial movement by the pockets and having screw threads at their inner surfaces arranged to engage with and disengage from the screw threads on the shaft, cam means operable to cam the screw threads on the gear segments into and out of threaded engagement with the gear threads on the shaft, and means operable to rotate the cage thereby rotating the gear sements and driving the shaft axially when the gear threads on the gear segments are in engagement with the gear threads on the shaft.

DESCRIPTION OF PREFERRED EMBODIMENTS

Figure 1:
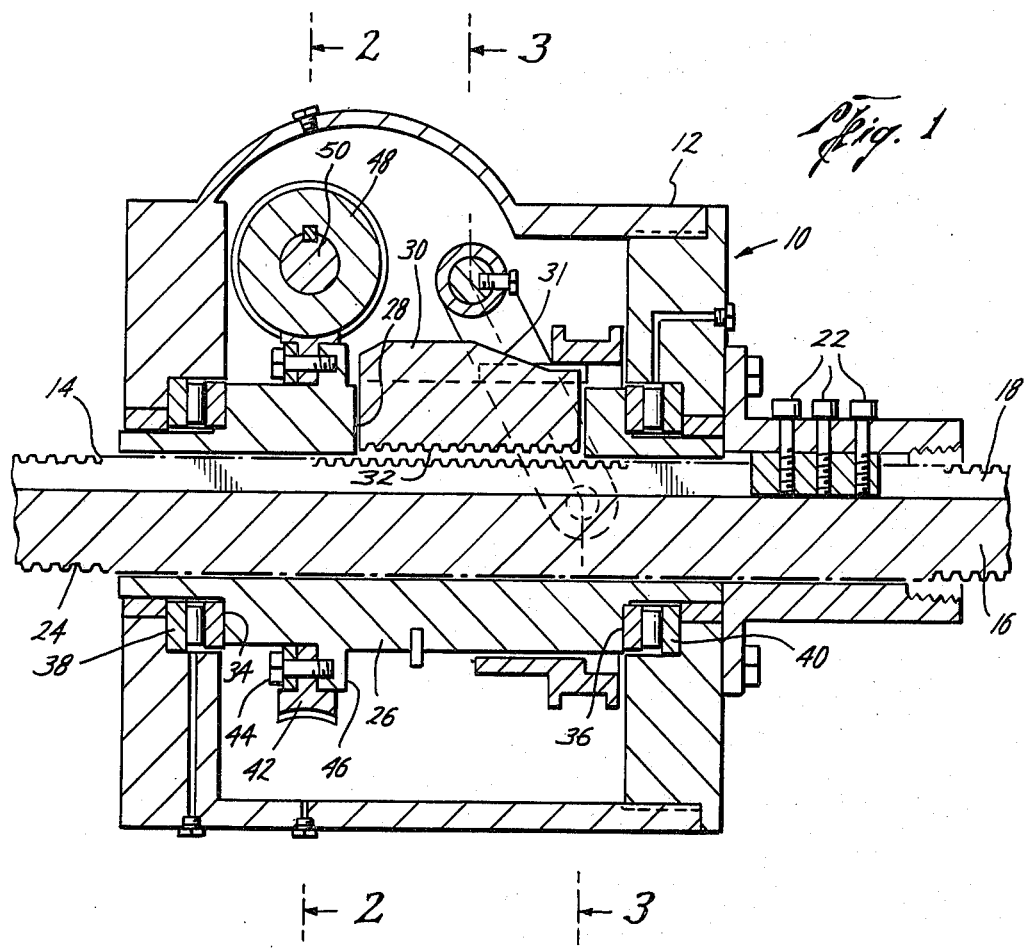
FIG. 1 is a side view, in section, illustrating an auxiliary engageable and disengageable drive apparatus according to the invention.

Referring to the drawings, and particularly to FIG. 1, the auxiliary engageable and disengageable drive assembly or apparatus is illustrated and generally designated by the reference numeral 10. It includes the body 12 which is provided with the axial bore 14 passing therethrough into which the shaft 16 is movable in an axial direction by a power driving assembly, not shown. The shaft 16 has the keyway 18 extending at least along its length of movement through the body 10 and a key 20 is secured to the body 12 in the axial bore 14, such as by the bolts 22, which is disposed in the keyway 18 and is operable to prevent rotation of the shaft 16. Thus, the shaft 16 is free to move axially in both directions and its travel is not limited or restricted by the auxiliary drive apparatus 10.

The shaft 16 is provided with screw threads 24 along its length or a distance required for the desired movement of the shaft 16.

Rotatably disposed about the shaft 16 is a cage 26 which is provided with a series of circumferentially disposed, elongate pockets 28 into which are disposed the elongate gear segments 30. Any number of pockets 28 and gear segments 30 can be used; however, in practice three elongate gear segments 30 have been found to be satisfactory for high thrust loads. The gear segments 30 are movable toward and away from the shaft 16 and are provided with screw threads 32 which mesh with the screw threads 24 on the shaft 16 when in engagement therewith.

The cage 26 has the outwardly facing annular shoulders 34 and 36 which engage the thrust bearing assemblies 38 and 40, respectively, so that very high thrusts on the shaft 16, for example up to and above 40,000 pounds, can be accomodated.

A worm gear 42 is secured to the cage 26, such as by the bolts 44 securing the worm gear 42 to the annular shoulder 46 extending outwardly on the cage 26. A worm 48 is provided in meshing engagement with the worm gear 42 which is secured to the worm gear shaft 50 which has the handle 52.

From the foregoing it is seen that rotation of the shaft 50 by the handle 52 drives the worm 48 which in turn rotates the cage 26 and thus the gear segments 32 disposed in the pockets 28 thereof which drives the shaft 16 axially when the gear segments 32 are in threaded or meshing engagement with the shaft 16.

Figure 2:
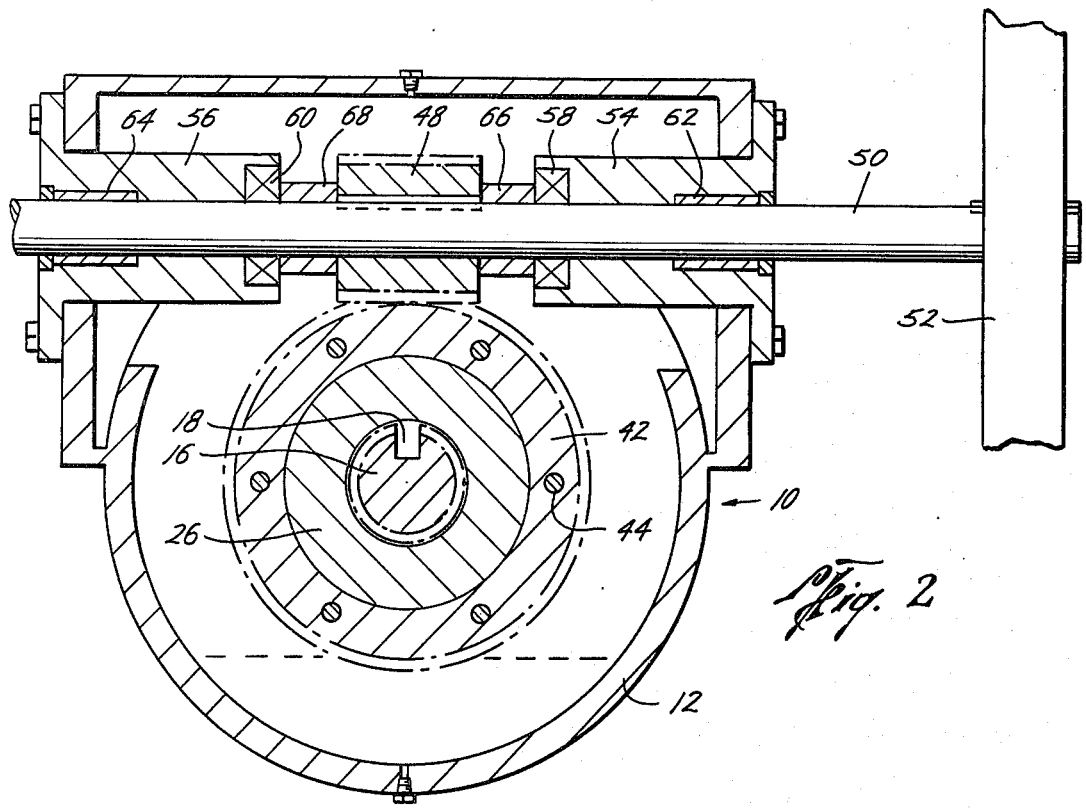
FIG. 2 is a cross-sectional view taken along the line 2—2 of FIG. 1.

Referring now to FIG. 2, the worm shaft 50 is rotatably disposed in the body 12 by means of the bearings 54 and 56 which include roller type bearings 58 and 60 at their respective inner ends and the seals 62 and 64 at their respective outer ends. Also provided are spacer tubes 66 and 68 disposed about the worm shaft 50 which serve as spacers for centering the worm 48 as illustrated.

A gear reduction is provided by the worm 48 and the worm gear 42. Thus, the worm 48 can be rotated readily and easily in either direction, which in turn rotates the worm gear in either direction, which in turn drives the shaft 16 axially in either direction.

No further detailed description is given of the means for rotatably journaling the worm shaft 50 in the body 12 as any desired means can be utilized; however, antifriction means, such as roller bearings diagramatically illustrated at 58 and 60 are preferred for high thrust, such as up to 40,000 pounds.

Figure 4:
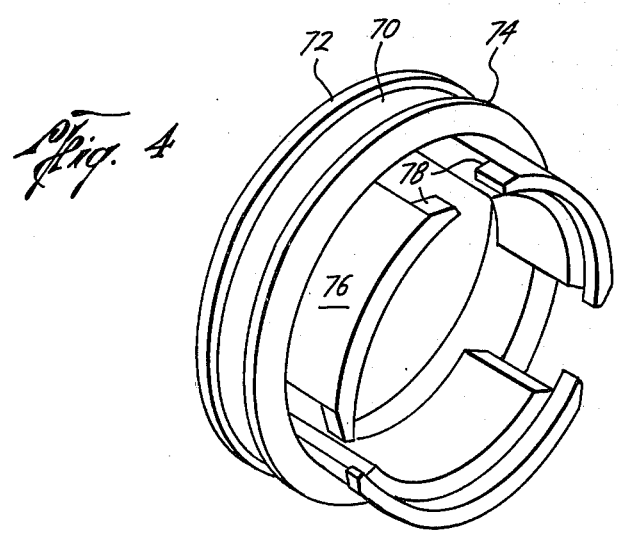
FIG. 4 is a perspective view illustrating a cylindrical guide ring for caming the gear segments into and out of engagement with a threaded shaft to be driven.
Figure 3:
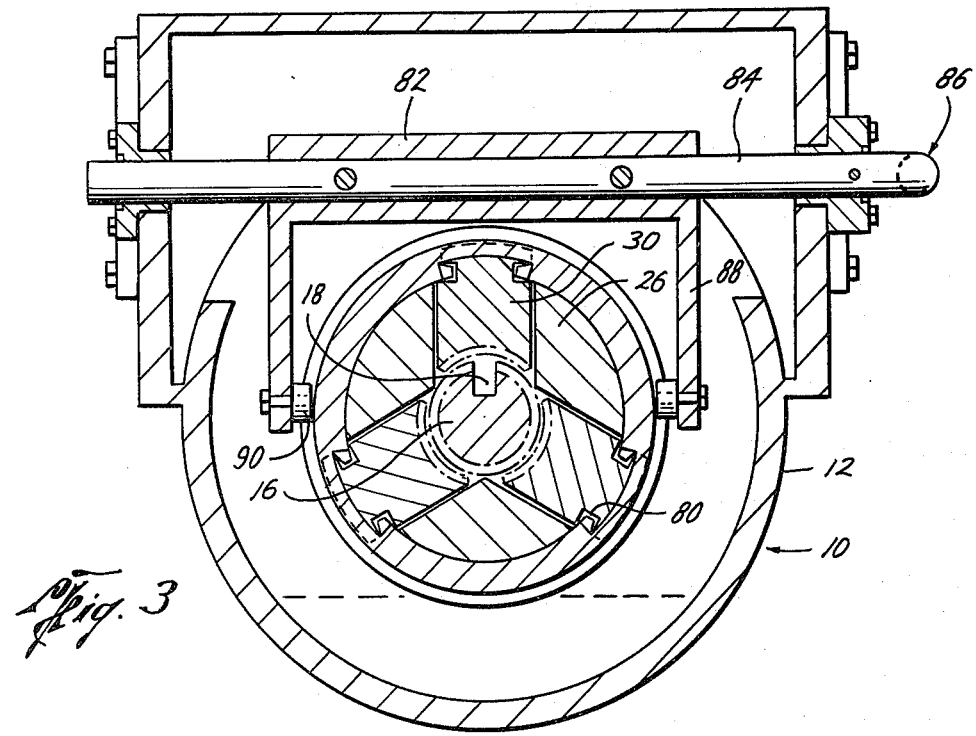
FIG. 3 is a sectional view taken along the line 3—3 of FIG. 1.

Referring now to FIGS. 3 and 4 the means for caming the gear segments 30 into and out of engagement with the shaft 16 is illustrated. A generally cylindrical cam ring 70 is provided which has a pair of axially spaced annular shoulders 72 and 74, which cam ring 70 is welded or otherwise secured about the axially and circumferentially extending and spaced from one another segments 76 provided with the circumferentially extending tongues 78 which slide in the grooves 80 of the gear segments 30, as best seen in FIG. 3, which maintain the gear segments 30 in position to be cammed toward and away from the shaft 16 while permitting axial movement of the cam guide ring 70 with respect to the gear segments 30.

As best seen in FIG. 3, a cam ring lever 82 is secured to the cam shaft 84 which can be manually actuated by the hand lever 86. The cam lever 82 has the depending arms 88 provided at their inner ends with the rollers 90 which are disposed between and which engage the inner surfaces of the annular flanges 72 and 74. The gear segments 30 have the cam surfaces 31 on their surfaces which are engaged by the inner surface of the camming ring 70. Thus, upon rotation of the handle 86 the cam shaft 84 and cam lever 82 are rotated which causes an axial movement of the cam ring 70 with respect to the gear segments 30 thereby camming the gear segments 30 inwardly into and outwardly out of engagement with the gear shaft 16.

In use, the device is assembled about the shaft 16 as illustrated. When it is desired to override the normal actuating means to move the shaft 16 axially, the gear segments are cammed into engagement with the gear thread on the shaft 16 by rotating the hand lever 86. Advantageously, this can be accomplished with shaft 16 at rest in any position. The handle or wheel 52 is then rotated which rotates the cage 26 thus rotating the gear segments 30 which move the shaft 16 in an axial direction without rotating it. The shaft 16 can be moved in either direction simply by rotating the handle or wheel 52 in the desired direction. If desired, power assist, not shown, can be used on the shaft 50.

While the preferred embodiment has been described in connection with valve actuators, the override drive apparatus can be used for all types of drive assemblies where it is desired to move a shaft in an axial direction without rotation.

The present invention, therefore, is well suited and adapted to attain the objects and ends and has the advantages and features mentioned as well as others inherent therein.

While a presently preferred example of the invention has been given for purposes of the disclosure, changes can be made therein which are within the spirit of the invention as defined by the appended claims.

What is claimed is:

1. An engageable and disengageable gear asembly for driving a shaft axially comprising,
   a body having an axial bore therethrough,
   a shaft movable axially through the bore and having screw threads thereon,
   a keyway extending axially along the shaft,
   a key connected to the body and slidably disposed in the keyway preventing rotation of the shaft,
   a cage in the body rotatably diposed about the shaft and having a plurality of circumferentially disposed elongate pockets therethrough and annularly-extending, inwardly facing thrust shoulders at each of the pockets and outwardly facing annular thrust shoulders at each end of the cage,
   thrust bearings rotatably disposed in the body about the shaft having inwardly facing annular thrust shoulders disposed on each side of the cage, the thrust bearings annular thrust shoulders bearing against their cooperating annular thrust shoulders on the cage and thereby restraining axial movement of the cage,
   a plurality of gear segments movable toward and away from the shaft disposed in the pockets and having screw threads at their inner surfaces arranged to engage with and disengage from the screw threads on the shaft, the gear segments having at their ends annularly-extending, outwardly-facing thrust shoulders engagable with their corresponding thrust shoulders at each end of the pockets,
   cam means operable to cam the gear segments toward and away from the shaft and thereby the screw threads on the gear segments into and out of threaded engagement with the gear threads on the shaft, and
   means operable to rotate the cage thereby rotating the gear segments and driving the shaft axially when the gear threads on the gear segments are in engagement with the gear threads on the shaft.

2. The gear assembly of claim 1 where, the cam means is manual.

3. The gear assembly of claim 1 where, the means to rotate the cage is manual.

4. The gear assembly of claim 1 where, the cam means is manual, and
   the means to rotate the cage is manual.

5. The gear assembly of claim 1 where the means to rotate the cage comprises,
   reduction gearing operable to permit rotation of the cage manually.

6. The gear assembly of claim 1 where the means to rotate the cage comprises, a worm gear secured about the cage,
a worm engaging and operable to rotate the worm gear,
a worm drive shaft connected to and operable to rotate the worm.

7. The apparatus of claim 6 where,
the worm and the worm gear are arranged to be operable to permit rotation of the cage manually.

8. The gear assembly of claim 1 where,
the cam means comprise a camming ring movable axially about the gear segments, and
cam surfaces on outer portions of the gear segments engagable by the camming ring,
whereby axial movement of the camming ring cams the gear segments to and away from the shaft thereby bringing the screw threads on the gear segments into and out of engagement with the screw threads on the shaft.

9. The gear assembly of claim 1 where,
the camming ring supports the gear segments in the cage.

10. An engagable and disengagable gear assembly for driving a shaft axially comprising,
a body having an axial bore therethrough,
a shaft movable axially through the bore and having screw threads thereon,
means operable to prevent rotation of the shaft in the bore,
a cage in the body rotatably disposed about the shaft and having a plurality of circumferentially disposed elongate pockets therethrough and inwardly-facing annularly extending thrust shoulders at each end of the pockets,
outwardly facing annular thrust shoulders at each end of the cage,
thrust bearings rotatably disposed in the body about the shaft on each side of the cage and having inwardly-facing annular thrust shoulders bearing against the outwardly facing annular shoulders of the cage operable to prevent axial movement of the cage in the body,
a plurality of gear segments movable toward and away from the shaft disposed in the pockets and having screw threads at their inner surfaces arranged to engage with and disengage from the screw threads on the shaft, the gear segments having annularly-extending, outwardly-facing annular thrust shoulders engagable with cooperating thrust shoulders at each end of the pockets,
a camming ring movable axially about the gear segments,
interfitting portions on the camming ring and each of the gear segments operable to support the gear segments in the pockets,
cam surfaces on outer portions of the gear segments engagable by the camming ring,
whereby axial movement of the camming ring cams the gear segments to and away from the shaft and the screw threads on the gear segments into and out of threaded engagement with the gear threads on the shaft,
means to move the camming ring, and
means operable to rotate the cage thereby rotating the gear segments and driving the shaft axially when the gear threads on the gear segments are in engagement with the gear threads on the shaft.

11. The gear assembly of claim 10 where the means to rotate the cage comprises,
a worm gear secured to the cage,
a worm engaging and operable to rotate the worm gear, and
a worm drive shaft connected to and operable to rotate the worm.

12. The gear assembly of claim 10 where,
the worm gear and worm provide reduction operable to permit rotation of the cage manually.

13. The gear assembly of claim 10 where the means to prevent rotation of the shaft in the bore comprises,
a keyway extending axially along the shaft, and
a key secured to the body and slidably disposed in the keyway.

* * * * *